United States Patent
Han et al.

(10) Patent No.: US 7,639,695 B2
(45) Date of Patent: Dec. 29, 2009

(54) SYSTEM AND METHOD FOR GIGABIT MEDIA INDEPENDENCE INTERFACE (GMII)-TO-SYSTEM PACKET INTERFACE LEVEL 3 (SPI-3) INTERFACE TRANSLATION

(75) Inventors: Soon-Seob Han, Seoul (KR); Byung-Chang Kang, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 761 days.

(21) Appl. No.: 11/300,357

(22) Filed: Dec. 15, 2005

(65) Prior Publication Data

US 2006/0140212 A1    Jun. 29, 2006

(30) Foreign Application Priority Data

Dec. 23, 2004    (KR) .................. 10-2004-0111488

(51) Int. Cl.
*H04J 3/16*    (2006.01)
(52) U.S. Cl. .................... 370/395.5; 370/469
(58) Field of Classification Search .............. 370/395.5, 370/466–469, 503; 398/69–75
See application file for complete search history.

(56) References Cited

U.S. PATENT DOCUMENTS

| | | | |
|---|---|---|---|
| 7,155,127 B2 * | 12/2006 | Akimoto et al. .............. 398/72 |
| 7,379,676 B2 * | 5/2008 | Kang et al. .................. 398/168 |
| 2004/0109473 A1 * | 6/2004 | Lebizay et al. .............. 370/466 |
| 2005/0063396 A1 * | 3/2005 | Yu .............................. 370/401 |
| 2005/0135808 A1 * | 6/2005 | Yun et al. ....................... 398/58 |
| 2005/0169319 A1 * | 8/2005 | Mohamadi ................... 370/514 |
| 2005/0196119 A1 * | 9/2005 | Popovic et al. .............. 385/134 |
| 2006/0004936 A1 * | 1/2006 | Karuppampalayam et al. ... 710/62 |
| 2006/0075175 A1 * | 4/2006 | Jensen et al. ................ 710/305 |
| 2006/0161817 A1 * | 7/2006 | Wong et al. ................... 714/43 |

* cited by examiner

*Primary Examiner*—William Trost, IV
*Assistant Examiner*—Roberta A Shand
(74) *Attorney, Agent, or Firm*—Robert E. Bushnell, Esq.

(57) ABSTRACT

A system and method for interface translation between a system packet interface level 3 (SPI-3) defines an interface between a physical device (PHY device) and a link layer device, and a gigabit media independence interface (GMII) which defines an interface between a media access control (MAC) portion of a gigabit Ethernet and a physical device. The system includes a translation circuit for translating a GMII reception signal, received from a GMII interface device, into an SPI-3 reception signal synchronized with an SPI3 reference clock, and for translating an SPI-3 transmission signal, received from an SPI-3 interface device, into a GMII transmission signal synchronized with a GMII reference clock.

15 Claims, 9 Drawing Sheets

SYSTEM AND METHOD FOR GIGABIT MEDIA INDEPENDENCE INTERFACE (GMII)-TO-SYSTEM PACKET INTERFACE LEVEL 3 (SPI-3) INTERFACE TRANSLATION

CLAIM OF PRIORITY

This application makes reference to, incorporates the same herein, and claims all benefits accruing under 35 U.S.C. §119 from an application for SYSTEM AND METHOD FOR GIGABIT MEDIA INDEPENDENCE INTERFACE (GMII)-TO-SYSTEM PACKET INTERFACE LEVEL 3 (SPI-3) INTERFACE TRANSLATION, filed in the Korean Intellectual Property Office on 23 Dec. 2004 and there duly assigned Serial No. 2004-111488.

BACKGROUND OF THE INVENTION

1. Technical Field

The present invention relates to a system and method for gigabit media independence interface (GMII)-to-system packet interface level 3 (SPI-3) interface translation and, more particularly, to a system and method for interface translation between a system packet interface level 3 (SPI-3), which defines an interface between a physical device (PHY device) and a link layer device, and a gigabit media independence interface (GMII), which defines an interface between a media access control (MAC) portion of a gigabit Ethernet and a physical device.

2. Description of the Related Art

Various kinds of communication protocols and interfaces are defined in communication and network systems. Interface matching is needed to enable communication with different protocols and interfaces because different interfaces are defined for different layers.

In particular, an SPI-3 interface mechanism defines a communication mechanism between a link layer device and a physical device (PHY device), and a gigabit media independent interface (GMII) mechanism defines an interface which connects a MAC portion and a physical device (PHY device) in a gigabit Ethernet. Accordingly, communication between a device with the SPI-3 interface mechanism and a device with the GMII interface mechanism requires matching of different protocols and interfaces.

SUMMARY OF THE INVENTION

It is an object of the present invention to provide a system and method for GMII-to-SPI-3 interface translation capable of minimizing latency time due to MAC address assignment, initialization or the like by connecting a translation circuit between a GMII device and an SPI-3 device so as to directly translate between protocols and interfaces.

According to one aspect of the present invention, there is provided a system for gigabit media independence interface (GMII)-to-system packet interface level 3 (SPI-3) interface translation, the system comprising a translation circuit for translating a GMII reception signal received from a GMII interface device into an SPI-3 reception signal synchronized to an SPI3 reference clock, and for translating an SPI-3 transmission signal received from an SPI-3 interface device into a GMII transmission signal synchronized to a GMII reference clock.

The translation circuit preferably comprises: a first translation circuit for translating the GMII reception signal received from the GMII interface device into an SPI-3 reception signal synchronized to the SPI3 reference clock based on starting frame delimiter (SFD) pattern information in the GMII reception signal; and a second translation circuit for translating the SPI-3 transmission signal received from the SPI-3 interface device into a GMII transmission signal synchronized to the GMII reference clock by adding the SFD pattern information to the SPI-3 transmission signal.

The first translation circuit preferably comprises: an SFD pattern detector for detecting the SFD pattern information from the GMII reception signal received from the GMII interface device; a first clock synchronizer for performing clock synchronization with the GMII reference clock and the SPI3 reference clock upon translating the GMII reception signal into the SPI-3 reception signal; and a first controller for translating the GMII reception signal into the SPI-3 reception signal according to the SPI3 reference clock from the first clock synchronizer when the SFD pattern information received from the SFD pattern detector matches pre-stored SFD pattern information.

The GMII reception signal may be transmitted by the GMII interface device in synchronization with the GMII_RXC clock signal only when a GMII RX_DV (Data Valid) signal is high.

The first controller preferably comprises: a comparator for comparing the SFD pattern information received from the SFD detector to the pre-stored SFD pattern information, and for generating a match signal when they match; a GMII receiving controller for synchronizing the GMII reception signal to the GMII reference clock in response to reception of the match signal from the comparator; and an SPI-3 receiving controller for translating the GMII reception signal synchronized by the GMII receiving controller into the SPI-3 reception signal according to the SPI3 reference clock.

The second translation circuit preferably comprises: a second clock synchronizer for performing clock synchronization with the GMII reference clock and the SPI3 reference clock upon translating the SPI-3 transmission signal into the GMII transmission signal; SFD pattern information generator for generating preamble and SFD pattern information according to a reference clock signal from the second clock synchronizer; and a second controller for translating the generated preamble and SFD pattern information from the SFD pattern information generator and the SPI-3 transmission signal into the GMII transmission signal according to the GMII reference clock from the second clock synchronizer.

The second controller preferably comprises: an SPI-3 transmission controller for synchronizing the SPI-3 transmission signal with an SPI3 reference clock; and a GMII transmission controller for translating the SPI-3 transmission signal synchronized by the SPI-3 transmission controller into the GMII transmission signal according to the GMII reference clock.

According to another aspect of the present invention, there is provided a method for gigabit media independence interface (GMII)-to-system packet interface level 3 (SPI-3) interface translation, the method comprising translating a GMII reception signal received from a GMII interface device into an SPI-3 reception signal synchronized with an SPI-3 reference clock based on SFD pattern information in the GMII reception signal.

Translating the GMII reception signal received from the GMII interface device into the SPI-3 reception signal synchronized with the SPI3 reference clock preferably comprises: detecting the SFD pattern information from the GMII reception signal received from the GMII interface device; performing clock synchronization with a GMII reference clock and the SPI3 reference clock upon translating the GMII reception signal into the SPI-3 reception signal; and translating the GMII reception signal into the SPI-3 reception signal according to the SPI3 reference clock when the detected SFD pattern information matches pre-stored SFD pattern information.

Translating the GMII reception signal into the SPI-3 reception signal according to the SPI3 reference clock preferably comprises: comparing the detected SFD pattern information to the pre-stored SFD pattern information and generating a match signal when they match; synchronizing the GMII reception signal with the GMII reference clock in response to receiving the match signal; and translating the GMII reception signal into the SPI-3 reception signal according to the SPI3 reference clock.

According to another aspect of the present invention, there is provided a method for gigabit media independence interface (GMII)-to-system packet interface level 3 (SPI-3) interface translation, the method comprising translating an SPI-3 transmission signal received from an SPI-3 interface device into a GMII transmission signal synchronized with a GMII reference clock by adding SFD pattern information to the SPI-3 transmission signal.

Translating the SPI-3 transmission signal transmitted by the SPI-3 interface device into the GMII transmission signal synchronized with the GMII reference clock by adding SFD pattern information to the SPI-3 transmission signal preferably comprises: performing clock synchronization with the GMII reference clock and an SPI3 reference clock; generating preamble and SFD pattern information according to the GMII reference clock; and translating the preamble and SFD pattern information and the SPI-3 transmission signal into the GMII transmission signal according to the GMII reference clock.

Translating the preamble and SFD pattern information and the SPI-3 transmission signal into the GMII transmission signal according to the GMII reference clock preferably comprises: synchronizing the SPI-3 transmission signal with the SPI3 reference clock; and translating the SPI-3 transmission signal synchronized with the SPI3 reference clock into the GMII transmission signal according to the GMII reference clock.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
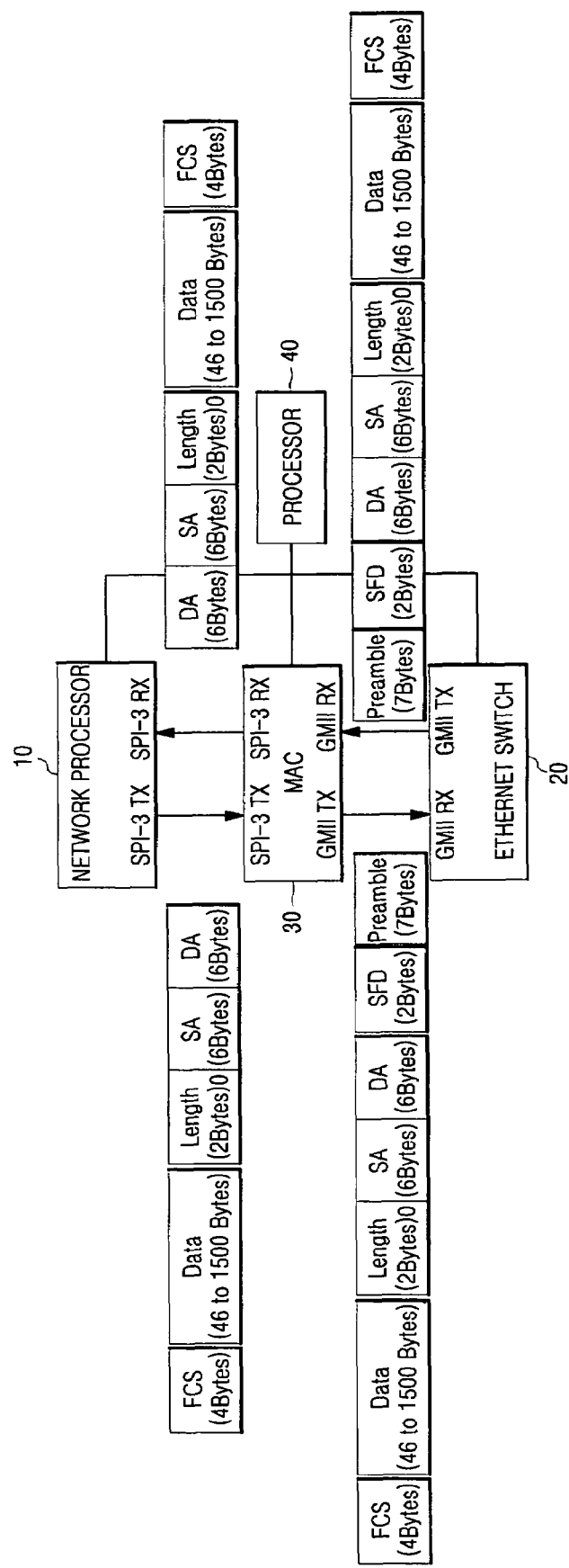
FIG. 1 illustrates an example of a system for GMII-to-SPI-3 interface translation.

FIG. 1 illustrates an example of a system for GMII-to-SPI-3 interface translation.

In FIG. 1, direct connection of an Ethernet switch 20 with a GMII interface to a network processor 10 with an SPI-3 interface cannot be made due to lack of interface and protocol matching.

As a way of addressing this problem, a media access control (MAC) 30 is connected between the network processor 10 and the Ethernet switch 20 for translating between protocols and interfaces, and a processor 40 is connected to control the MAC 30.

The MAC 30 translates the protocols and the interfaces between the network processor 10 and the Ethernet switch 20 under the control of the processor 40, enabling communication between the network processor 10 and the Ethernet switch 20.

In such a system, however, it is necessary for the processor 40 to be connected to the MAC 30 for controlling it, and for a MAC address to be assigned.

Furthermore, the processor 40 should have a driver for initializing or driving the MAC 30, which makes the overall system configuration complex.

Figure 2:
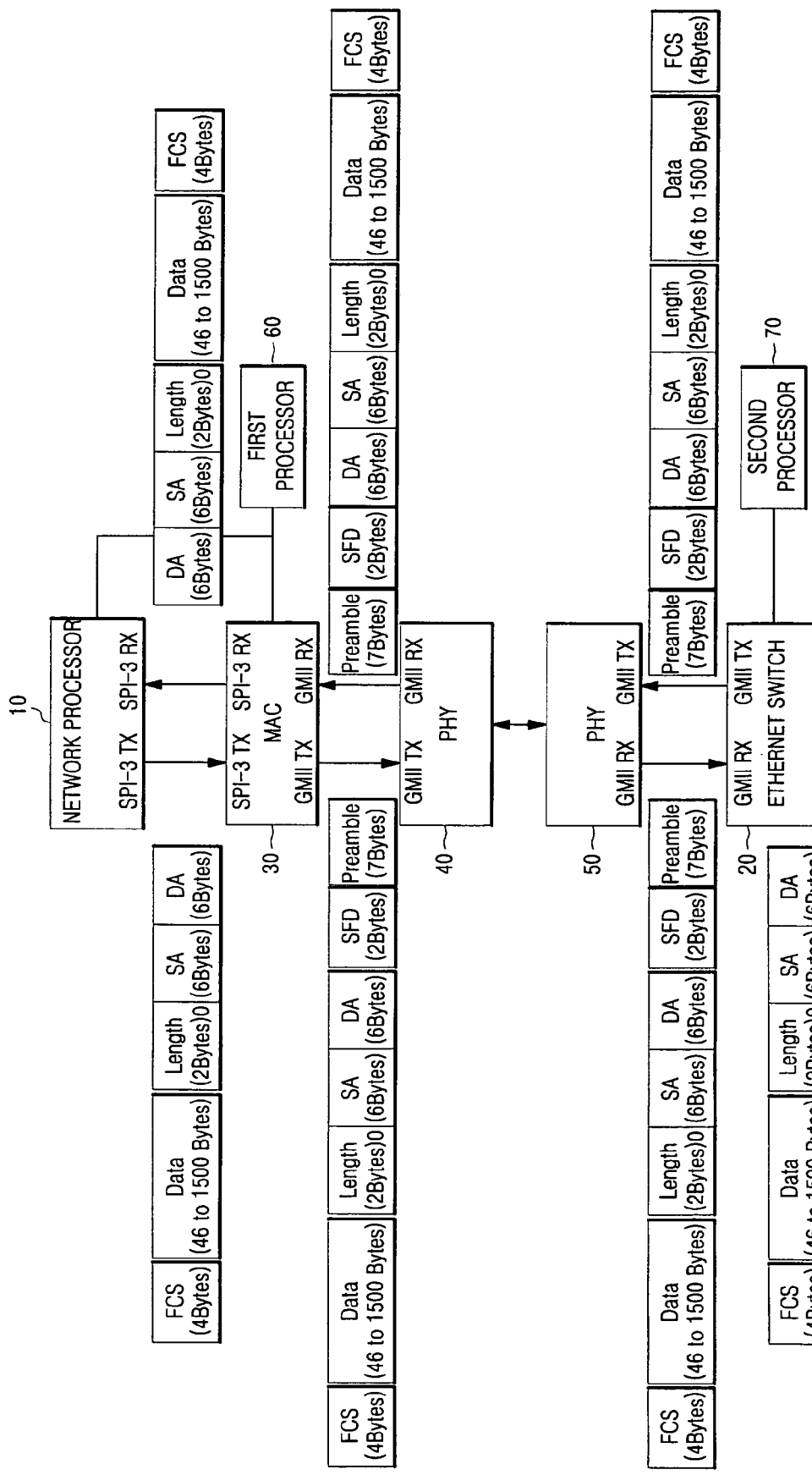
FIG. 2 illustrates another example of a system for GMII-to-SPI-3 interface translation.

FIG. 2 illustrates another example of a system for GMII-to-SPI-3 interface translation.

In FIG. 2, direct connection of the Ethernet switch 20 with a GMII interface to the network processor 10 with an SPI-3 interface cannot be made due to lack of interface and protocol matching.

As a way of addressing this problem, a MAC 30 for translating between protocols and interfaces, and physical devices 40 and 50 interconnected via Ethernet ports, are connected between the network processor 10 and the Ethernet switch 20, and first and second processors 60 and 70, respectively, are connected to the MAC 30 and the Ethernet switch 20, respectively, for controlling them.

The MAC 30 translates the protocols and the interfaces between the network processor 10 and the Ethernet switch 20 under the control of the first processor 60, enabling communication between the network processor 10 and the Ethernet switch 20.

Even in this system, however, it is necessary for the first and second processors 60 and 70 to be connected to the MAC 30 and the Ethernet switch 20, respectively, for controlling them, and also for a MAC address to be assigned.

Furthermore, as in the configuration of FIG. 1, the first processor 60 should have a driver for initializing or driving the MAC 30, which makes the overall system configuration complex, and which also increases latency time.

The present invention will now be described more fully with reference to the accompanying drawings, in which preferred embodiments of the invention are shown. This invention may, however, be embodied in different forms and should not be construed as being limited to the embodiments set forth herein. Rather, these embodiments are provided so that this disclosure will be thorough and complete, and will fully convey the concept of the invention to those skilled in the art.

Figure 3:
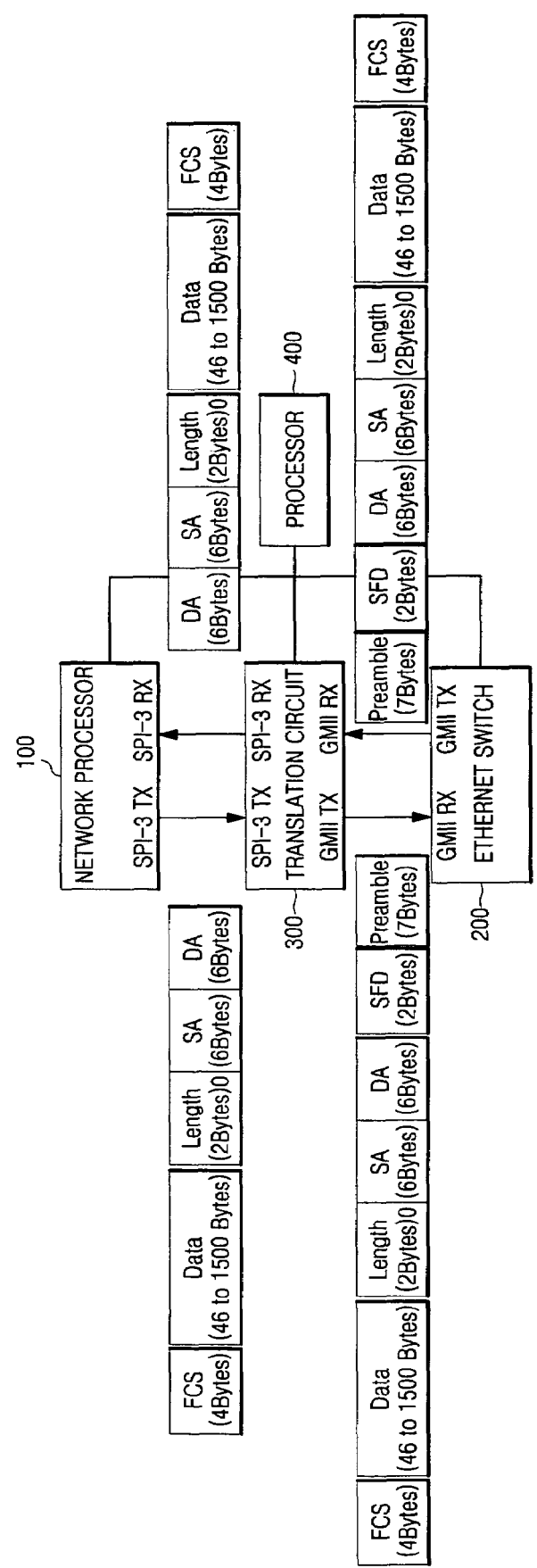
FIG. 3 illustrates a schematic configuration of a system for GMII-to-SPI-3 interface translation according to the present invention.

FIG. 3 illustrates a schematic configuration of a system for GMII-to-SPI-3 interface translation according to the present invention.

As shown in FIG. 3, the GMII-to-SPI-3 interface translation system includes a network processor 100 with an SPI-3 interface, an Ethernet switch 200 with a GMII interface, a translation circuit 300 for translating interfaces and protocols between the network processor 100 and the Ethernet switch 200, and a processor 400 for controlling the network processor 100 and the Ethernet switch 200.

The translation circuit 300 translates a GMII RX signal received from the Ethernet switch 200 into an SPI-3 RX signal for the SPI-3 interface and protocol, and transmits the SPI-3 RX signal to the network processor 100. Conversely, the translation circuit 300 translates an SPI-3 TX signal received from the network processor 100 into a GMII TX signal for the GMII interface and protocol, and transmits the GMII TX signal to the Ethernet switch 200.

Figure 4:
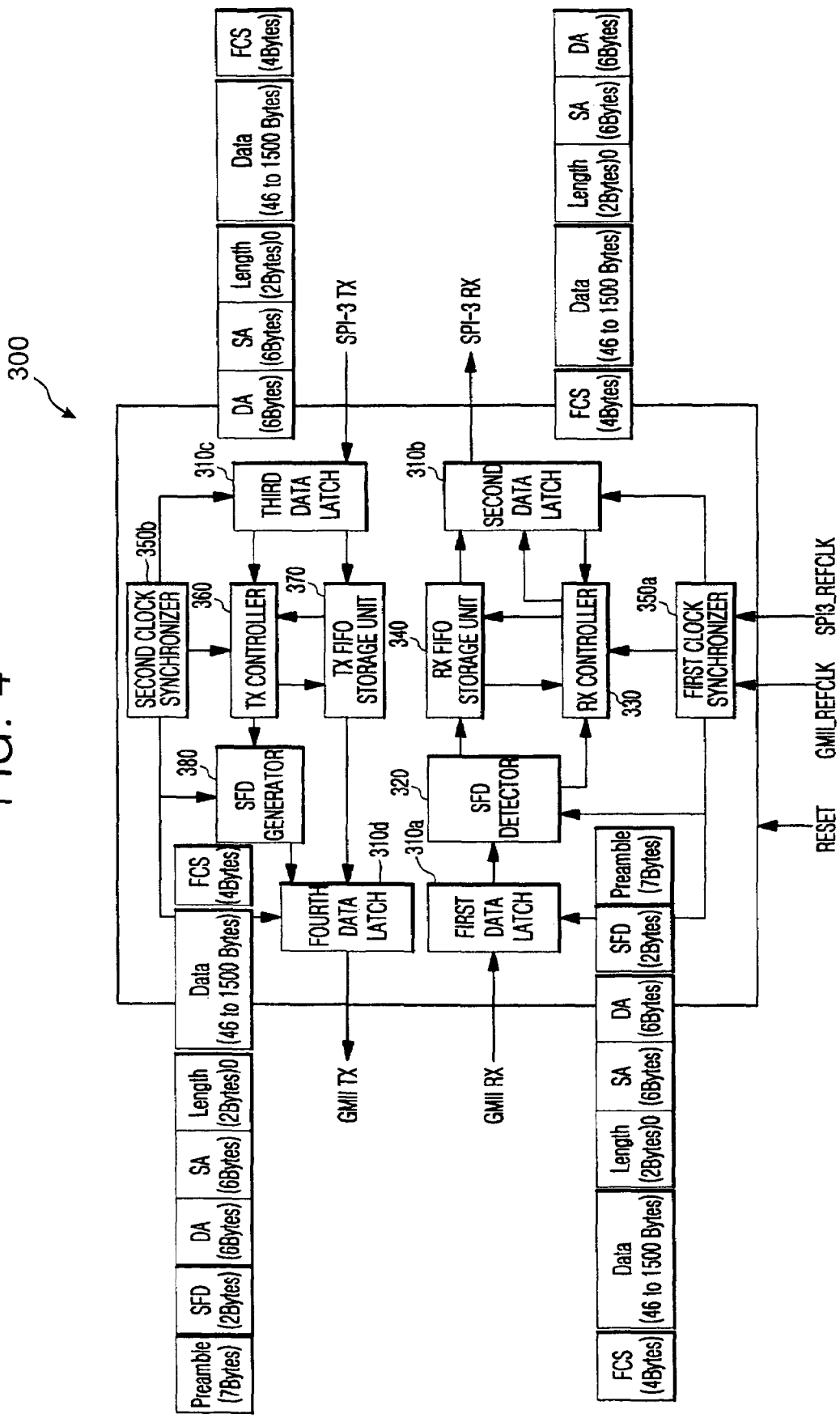
FIG. 4 illustrates a detailed configuration of the translation circuit of FIG. 3.
Figure 5:
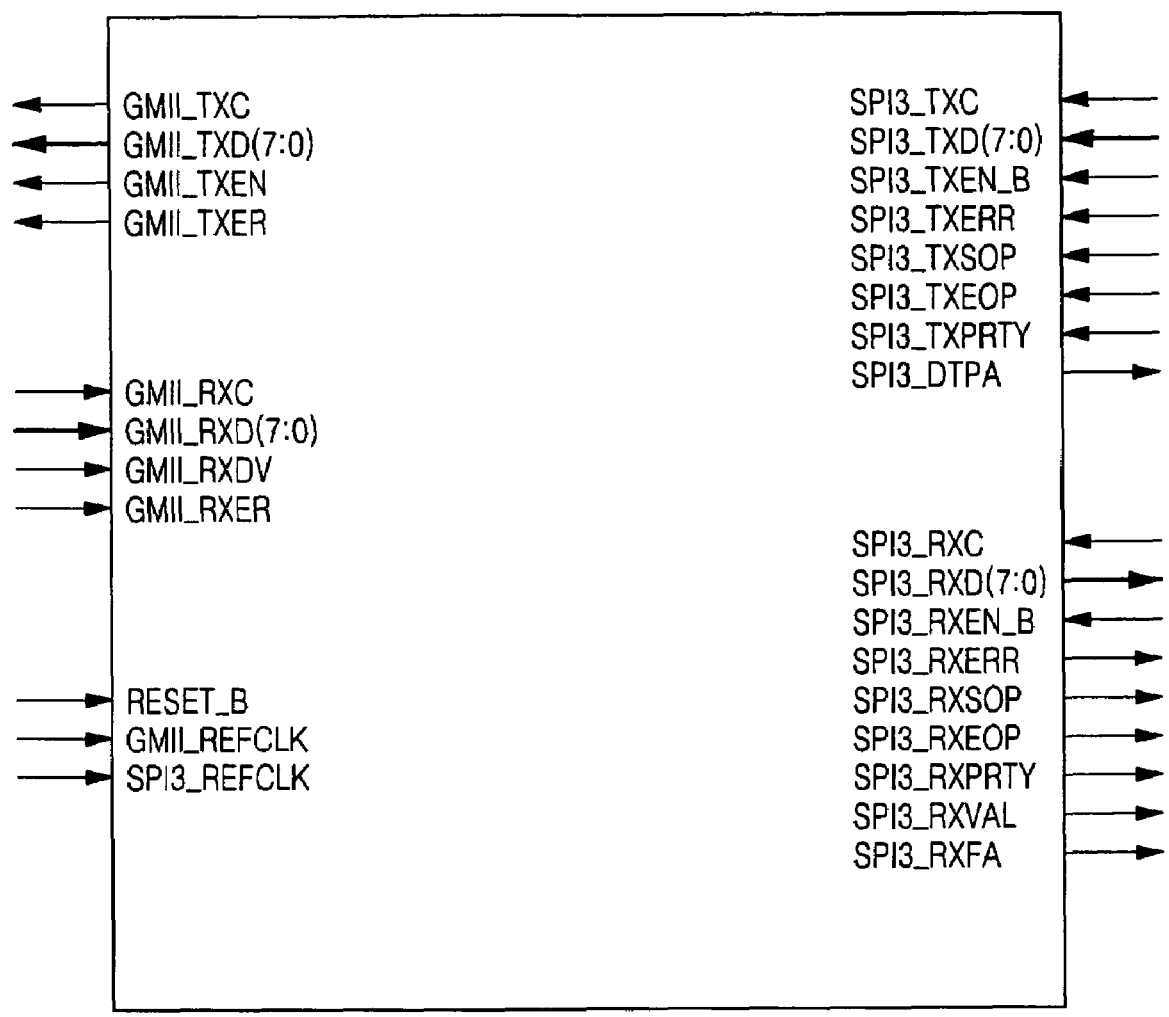
FIG. 5 illustrates an example of pin allocation in the translation circuit of FIG. 3.

FIG. 4 illustrates a detailed configuration of the translation circuit of FIG. 3, and FIG. 5 illustrates an example of pin allocation in the translation circuit of FIG. 3.

As shown in FIG. 4, the translation circuit 300 of the present invention includes a translator for translating the GMII RX signal into the SPI-3 RX signal, and a translator for translating the SPI-3 TX signal into the GMII TX signal.

First, the translator for translating the GMII RX signal into the SPI-3 RX signal includes a first data latch 310a, a starting frame delimiter (SFD) detector 320, an RX controller 330, an RX FIFO storage unit 340, a second data latch 310b, and a first clock synchronizer 350a.

The first data latch 310a latches GMII RXD (7:0) data in synchronization with a GMII_RXC clock signal while a GMII RX_DV (Data Valid) signal received from the Ethernet switch is high.

The SFD detector 320 receives the latched data from the first data latch 310a, detects information in preamble and SFD fields of the latched data, and transmits bit stream information in the SFD field to the RX controller 330.

The RX controller 330 receives the bit stream information in the SFD field from the SFD detector 320, compares the received bit stream information to pre-stored SFD bit stream information (10101011), and if they match, stores only actual data, excluding the preamble and SFD fields, in the RX FIFO storage unit 340.

After storing the actual data in the RX FIFO storage unit 340, the RX controller 330 also determines the state of an SPI-3_RXEN_B signal, which is a FIFO status signal of SPI-3 received from the network processor 100. If the SPI-3_RXEN_B signal is low, the RX controller 330 transmits an SPI3_RXSOP (Start Of Packet) signal and an SPI3_RXEOP (End Of Packet) signal to the network processor 100 in synchronization with an SPI3_REFCLK reference clock signal provided by the first clock synchronizer 350a.

After transmitting the SPI3_RXSOP signal, the RX controller 330 also translates the data stored in the RX FIFO storage unit 340 into SPI3_RXD (7:0) data synchronized with the SPI3_REFCLK reference clock signal, and transmits the SPI3_RXD (7:0) data to the network processor 100 via the second data latch 310b.

That is, after the SPI3_RXSOP signal synchronized with the SPI3_REFCLK reference clock signal is first transmitted, the SPI3_RXD (7:0) data is transmitted, and then the SPI3_RXEOP signal is transmitted.

The second data latch 310b receives the SPI3_RXSOP signal and the SPI3_RXEOP signal from the RX controller 330, and the SPI3_RXD (7:0) data from the RX FIFO storage unit 340, and latches and transmits them to the network processor 100.

The first clock synchronizer 350a serves to provide the GMII_REFCLK and SPI3_REFCLK reference clocks to synchronize clocks depending on the interfaces upon translation of the GMII RX signal into the SPI-3 RX signal.

Meanwhile, the translator for translating the SPI-3 TX signal into the GMII TX signal includes a third data latch 31c, a TX controller 360, a TX FIFO storage unit 370, a starting frame delimiter (SFD) generator 380, a fourth data latch 310d, and a second clock synchronizer 350b.

The third data latch 310c latches SPI TXD (7:0) data, which is received from the network processor 100 with the SPI-3 TX signal, in synchronization with an SPI3_TXC clock signal, and then transmits the latched SPI TXD (7:0) data to the TX FIFO storage unit 370.

The TX controller 360 receives an SPI3_TXSOP signal and an SPI3_TXEOP signal from the network processor 100 when an SPI3_TXEN_B signal received via the third data latch 310c is low.

Furthermore, in response to receiving the SPI3_TXSOP signal from the network processor 100, the TX controller 360 stores the latched SPI TXD (7:0) data within the third data latch 310c in the TX FIFO storage unit 370.

In addition, when receiving a high GMII_TXEN signal from the Ethernet switch 200, the TX controller 360 transmits a preamble and SFD pattern generation signal to the SFD generator 380 in synchronization with a GMII_REFCLK reference clock signal provided by the second clock synchronizer 350b.

The TX controller 360 also translates the SPI TXD (7:0) data stored in the TX FIFO storage unit 370 into GMII_TXD (7:0) data synchronized with the GMII_REFCLK reference clock signal, and transmits the GMII_TXD (7:0) data to the fourth data latch 310d.

The SFD generator 380 generates a preamble pattern (10101010) and an SFD pattern (10101011), and transmits the patterns to the fourth data latch 310d under the control of the TX controller 360.

The fourth data latch 310d latches the preamble 10101010 and the SFD pattern (10101011) information generated by the SFD generator 380, and the GMII_TXD (7:0) data transmitted by the TX FIFO storage unit 370, and transmits a GMII_TX signal to the Ethernet switch 200. In the latter regard, the fourth data latch 310d transmits the preamble 10101010 and the SFD pattern (10101011) information, and then transmits the GMII_TXD (7:0) data.

The second clock synchronizer 350b provides the GMII_REFCLK and the SPI3_REFCLK reference clocks to synchronize clocks depending on the interface upon translation of the SPI-3 TX signal into the GMII TX signal.

Figure 6:
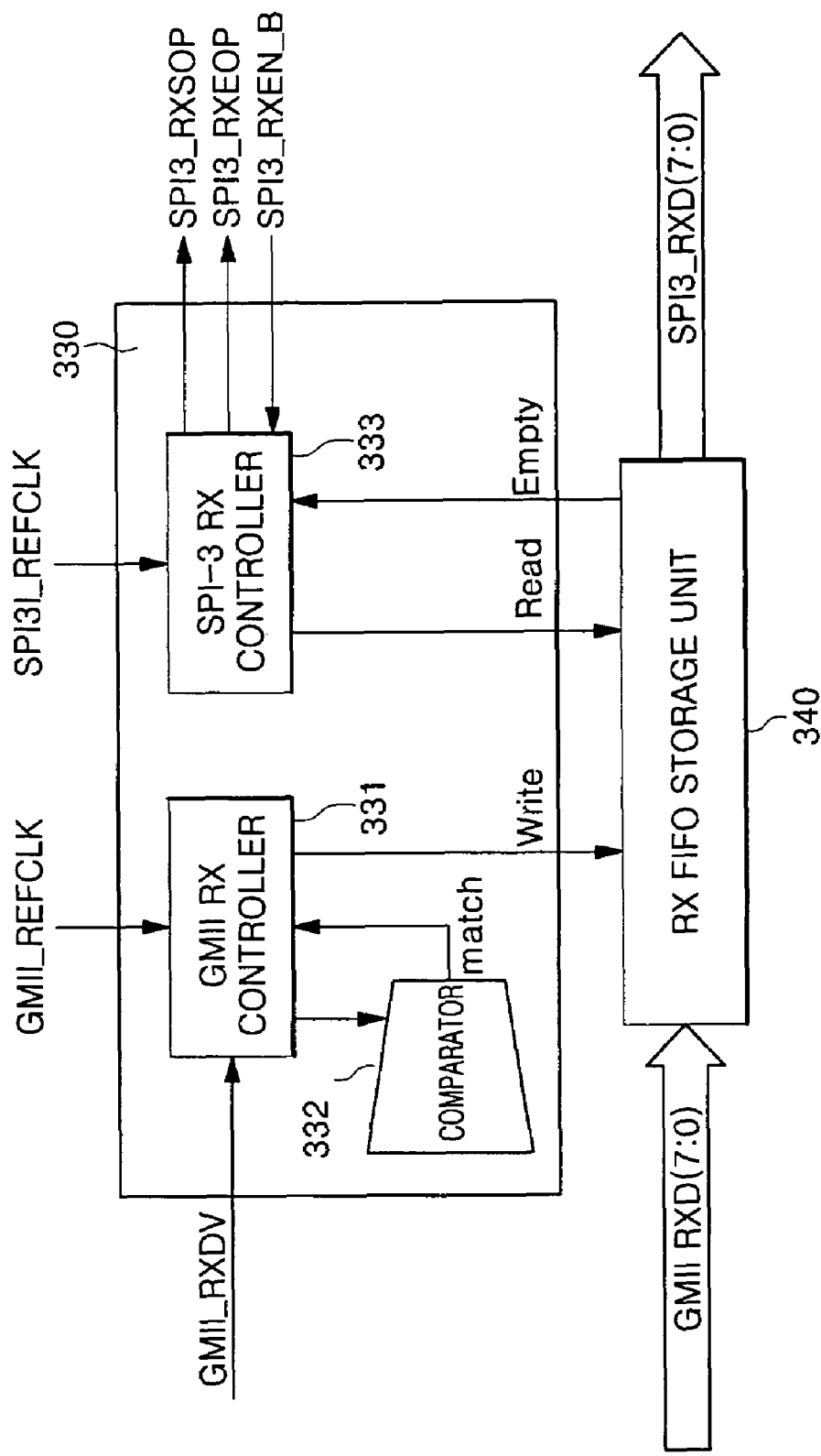
FIG. 6 illustrates a detailed configuration of the RX controller of FIG. 4.

FIG. 6 illustrates a detailed configuration of the RX controller of FIG. 4.

As shown in FIG. 6, the RX controller 330 according to the present invention includes a GMII RX controller 331, a comparator 332, and an SPI-3 RX controller 333.

The GMII RX controller 331 latches the GMII RXD (7:0) data in the register in synchronization with the GMII_RXC clock signal while the GMII RX_DV (Data Valid) signal received from the Ethernet switch is high.

The comparator 332 receives the bit stream information of the detected SFD field from the starting frame delimiter (SFD) detector 320, and compares the bit stream information to the pre-stored SFD pattern (10101011). If the bit stream information of the received SFD field matches the pre-stored SFD pattern (10101011) information, the comparator 332 transmits a match signal to the GMII RX controller 331.

The GMII RX controller 331 receives the match signal from the comparator 332, and stores only actual data, excluding the preamble field and the SFD field, in the RX FIFO storage unit 340.

The SPI-3 RX controller 333 also determines the state of an SPI-3_RXEN_B signal, which is a FIFO status signal of SPI-3 received from the network processor 100. If the SPI-3_RXEN_B signal is low, the SPI-3 RX controller 333 transmits an SPI3_RXSOP (Start Of Packet) signal and an SPI3_RXEOP (End Of Packet) signal to the network processor 100 in synchronization with an SPI3_REFCLK reference clock signal.

That is, after transmitting the SPI3_RXSOP signal, the SPI-3 RX controller 331 translates the stored data in the RX FIFO storage unit 340 into the SPI3_RXD (7:0) data synchronized with the SPI3_REFCLK reference clock signal, and transmits the SPI3_RXD (7:0) data to the network processor 100.

The SPI-3 RX controller 331 also transmits the SPI3_RXEOP signal to the network processor 100 when the RX FIFO storage unit 340 is empty due to data transmission completion.

Figure 7:
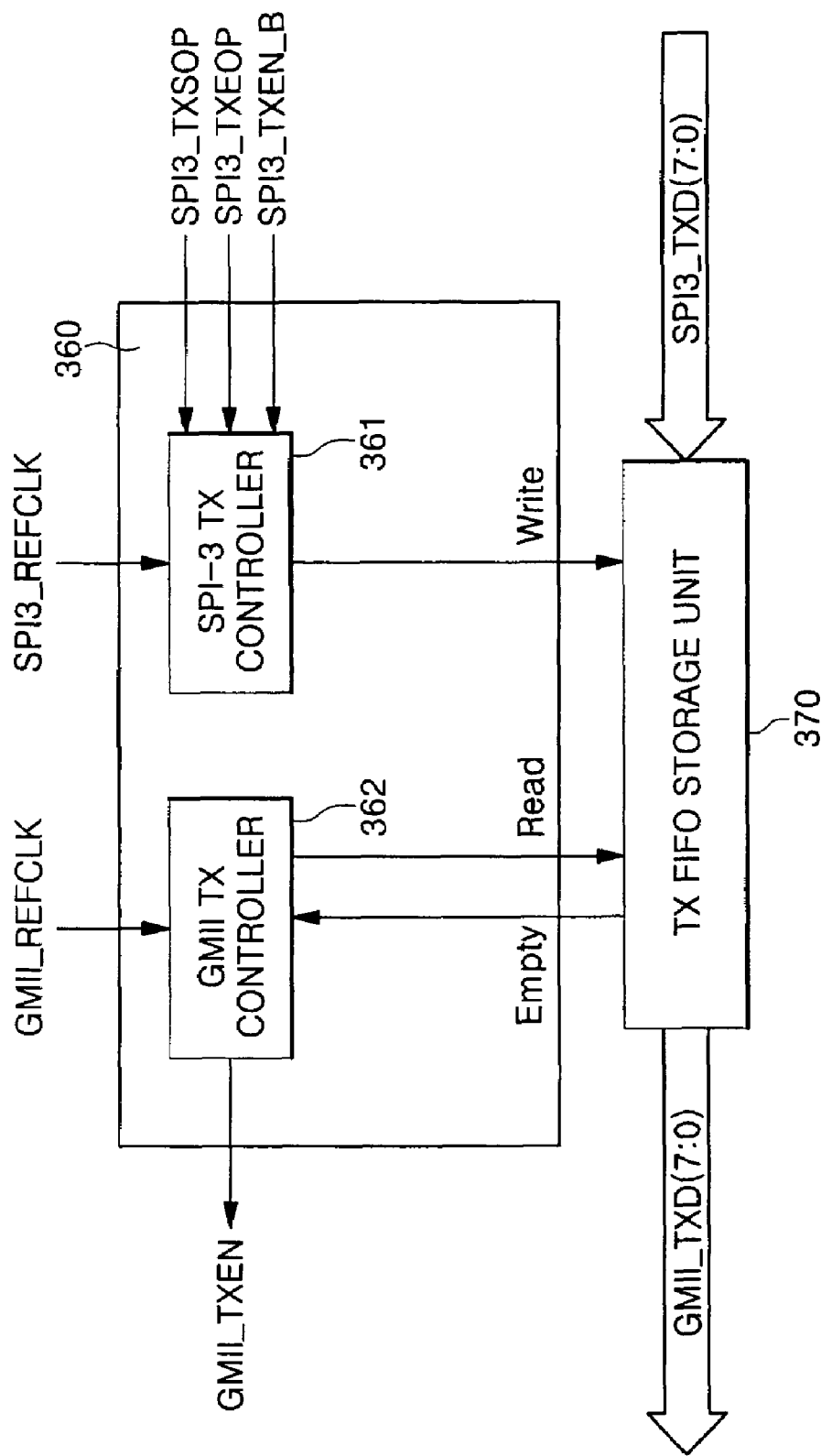
FIG. 7 illustrates a detailed configuration of the TX controller of FIG. 4.

FIG. 7 illustrates a detailed configuration of the TX controller of FIG. 4.

As shown in FIG. 7, the TX controller 360 according to the present invention includes an SPI-3 TX controller 361 and a GMII TX controller 362.

The SPI-3 TX controller 361 receives an SPI3_TXEN_B signal from the network processor 100 with the SPI-3 TX signal. When the SPI3_TXEN_B signal is low, the SPI-3 TX controller 361 further receives an SPI3_TXSOP signal and an SPI3_TXEOP signal from the network processor 100.

After receiving the SPI3_TXSOP signal, the SPI-3 TX controller 361 stores the latched SPI TXD (7:0) data within the third data latch 310*c* (FIG. 4) in the TX FIFO storage unit 370.

When the GMII_TXEN signal transmitted to the Ethernet switch 200 is high, the GMII TX controller 362 transmits a preamble and SFD pattern generation signal to the SFD generator 380 in synchronization with the GMII_REFCLK reference clock signal.

In response to receiving the preamble and SFD pattern generation signal, the SFD generator 380 generates and transmits a preamble pattern (10101010) and an SFD pattern (10101011) to the Ethernet switch 200, and then transmits a translation completion signal to the GMII TX controller 362.

When receiving the translation completion signal from the SFD generator 380, the GMII TX controller 362 translates the stored SPI TXD (7:0) data within the TX FIFO storage unit 370 into the GMII_TXD (7:0) data synchronized with the GMII_REFCLK reference clock signal, and transmits the GMII_TXD (7:0) data to the Ethernet switch 200.

Furthermore, when the TX FIFO storage unit 370 is empty due to data transmission completion, the GMII TX controller 362 transmits a low GMII_TXEN signal to the Ethernet switch 200 to indicate that subsequently transmitted data is invalid.

Figure 8:
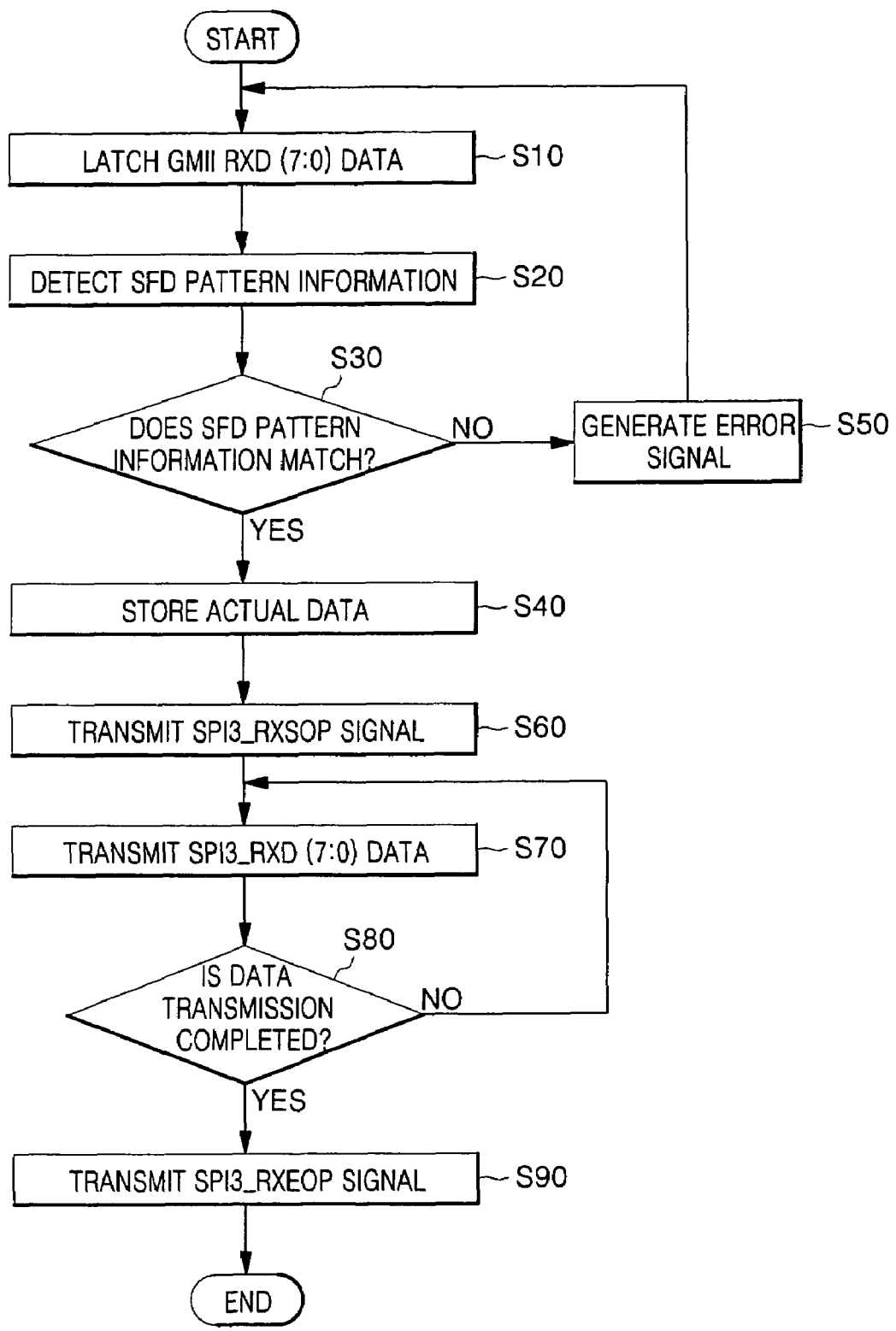
FIG. 8 is a flowchart illustrating a GMII-to-SPI-3 interface translation process according to the present invention.

FIG. 8 is a flowchart illustrating a GMII-to-SPI-3 interface translation process according to the present invention.

As shown in FIG. 8, the GMII RXD (7:0) data synchronized with the GMII_RXC clock signal is latched in the register (S10), and is then transmitted to the SFD detector 320 while the GMII RX_DV (Data Valid) signal from the Ethernet switch 200 with the GMII interface is high.

Upon receipt of the GMII RXD (7:0) data, the SFD detector 320 detects SFD pattern information from the received GMII RXD (7:0) data (S20), and transmits the SFD pattern information to the RX controller 330.

The RX controller 330 compares the SFD pattern information received from the SFD detector 320 to the pre-stored SFD pattern information (10101011), and determines whether the received SFD pattern information matches the pre-stored SFD pattern information (S30).

If the received SFD pattern information matches the pre-stored SFD pattern information, only actual data, excluding the preamble field and the SFD field in the GMII RXD (7:0) data, is stored in the RX FIFO storage unit 340 under the control of the RX controller 330 (S40).

If the received SFD pattern information does not match the pre-stored SFD pattern information, the RX controller 330 generates an error signal (S50). In this case, the process returns to step S10 where the GMII RXD (7:0) data synchronized with the GMII_RXC clock signal is latched in the register (S10).

Subsequently, if an SPI-3_RXEN_B signal, which is a FIFO status signal of SPI-3 received from the network processor 100, is low, the RX controller 330 transmits an SPI3_RXSOP (Start Of Packet) signal to the network processor 100 in synchronization with the SPI3_REFCLK reference clock signal to indicate the initiation of data transmission (S60).

Under the control of the RX controller 330, the stored data in the RX FIFO storage unit 340 is then translated into the SPI3_RXD (7:0) data synchronized with the SPI3_REFCLK reference clock signal, and is transmitted to the network processor 100 (S70).

The RX controller 330 then determines whether the RX FIFO storage unit 340 is empty due to data transmission completion (S80).

If the RX FIFO storage unit 340 is empty, the RX controller 330 transmits an SPI3_RXEOP (End Of Packet) signal to the network processor 100 to indicate the data transmission completion (S90). If the RX FIFO storage unit 340 is not empty, the process returns to step S70.

Figure 9:
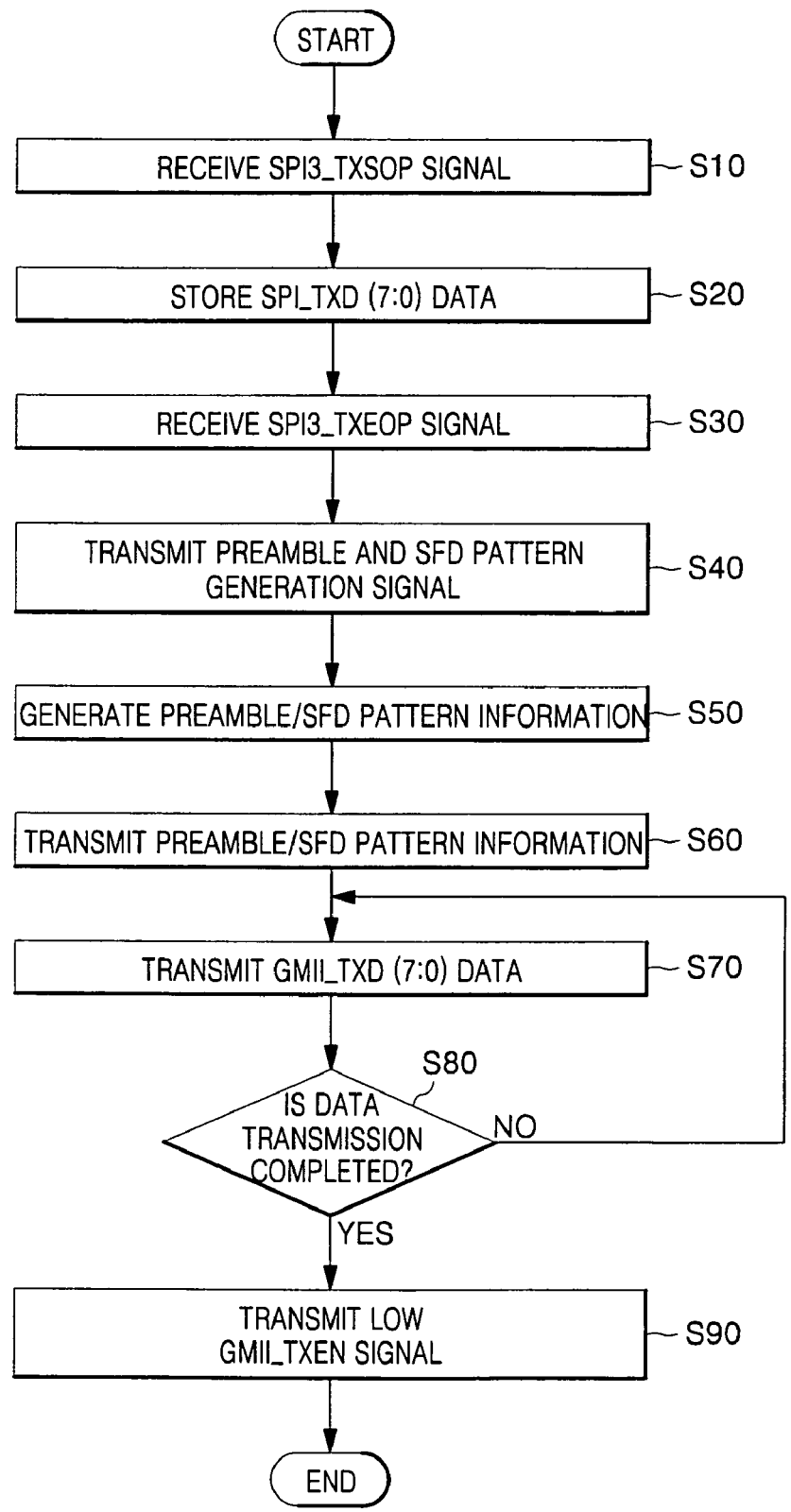
FIG. 9 is a flowchart illustrating an SPI-3-to-GMII interface translation process according to the present invention.

FIG. 9 is a flowchart illustrating an SPI-3-to-GMII interface translation process according to the present invention.

As shown in FIG. 9, when the SPI3_TXEN_B signal received from the network processor 100 with the SPI-3 TX signal is low, the TX controller 360 receives from the network processor 100 an SPI3_TXSOP signal indicating data transmission initiation (S10).

Under the control of the TX controller 360, the SPI_TXD (7:0) data transferred from the network processor 100 is latched in the latch 310*c* (FIG. 4) in synchronization with the SPI3_TXC clock signal, and is then stored in the TX FIFO storage unit 370 (S20).

The TX controller 360 then receives the SPI3_TXEOP signal indicating data transmission completion from the network processor 100 (S30).

When a GMII_TXEN signal transmitted to the Ethernet switch 200 with the GMII interface is high, the TX controller 360 transmits a preamble and an SFD pattern generation signal, which is synchronized with the GMII_REFCLK reference clock signal, to the SFD generator 380 (S40).

In response to receiving the preamble and SFD pattern generation signal, the SFD generator 380 generates a preamble pattern (10101010) and an SFD pattern (10101011) (S50), transmits the patterns to the Ethernet switch (S60), and then transmits a translation completion signal to the TX controller 360.

Under the control of the TX controller 360, which receives the translation completion signal from the SFD generator 380, the stored SPI TXD (7:0) data in the TX FIFO storage unit 370 is translated into the GMII_TXD (7:0) data synchronized with the GMII_REFCLK reference clock signal, and is then transmitted to the Ethernet switch 200 (S70).

The TX controller 360 then determines whether the TX FIFO storage unit 370 is empty due to data transmission completion (S80).

If the TX FIFO storage unit 370 is found to be empty, the TX controller 360 transmits a low GMII_TXEN signal to the Ethernet switch 200 to indicate that subsequently transmitted data is invalid (S90). If the TX FIFO storage unit 370 is found to be not empty, a return to step S70 is executed.

According to the present invention, a translation circuit is connected between the GMII device and the SPI-3 device to directly translate between the protocols and the interfaces. This minimizes latency time caused in prior systems by MAC address assignment, initialization, or the like, thereby resulting in more efficient interface translation.

While the present invention has been particularly shown and described with reference to exemplary embodiments thereof, it will be understood by those of ordinary skill in the art that various changes in form and detail may be made therein without departing from the spirit and scope of the present invention as defined by the following claims and their equivalents.

What is claimed is:

1. A system for gigabit media independence interface (GMII)-to-system packet interface level 3 (SPI-3) interface translation, comprising:
  a translation circuit translating a GMII reception signal received from a GMII interface device into an SPI-3 reception signal synchronized with an SPI3 reference clock, and translating an SPI-3 transmission signal received from an SPI-3 interface device into a GMII transmission signal synchronized with a GMII reference clock, said translation circuit comprising:
    first translation means for translating the GMII reception signal received from the GMII interface device into the SPI-3 reception signal synchronized with the SPI3 reference clock based on starting frame delimiter (SFD) pattern information in the GMII reception signal; and
    second translation means for translating the SPI-3 transmission signal received from the SPI-3 interface device into the GMII transmission signal synchronized with the GMII reference clock by adding the SFD pattern information to the SPI-3 transmission signal;
  said first translation means comprising:
    an SFD pattern detector for detecting the SFD pattern information from the GMII reception signal received from the GMII interface device;
    a first clock synchronizer for performing clock synchronization with the GMII reference clock and the SPI3 reference clock upon translating the GMII reception signal into the SPI-3 reception signal; and
    a first controller for translating the GMII reception signal into the SPI-3 reception signal according to the SPI3 reference clock from the first clock synchronizer when the SFD pattern information received from the SFD pattern detector matches pre-stored SFD pattern information.

2. The system according to claim 1, said GMII reception signal being received from the GMII interface device in synchronization with a GMII_RXC clock signal only when a GMII RX_DV (Data Valid) signal is high.

3. The system according to claim 1, said first controller comprising:
  a comparator for comparing the SFD pattern information received from the SFD pattern detector to the pre-stored SFD pattern information, and for generating a match signal when they match;
  a GMII receiving controller for synchronizing the GMII reception signal with the GMII reference clock in response to the match signal generated by the comparator; and
  an SPI-3 receiving controller for translating the GMII reception signal synchronized by the GMII receiving controller into the SPI-3 reception signal according to the SPI3 reference clock.

4. The system according to claim 1, said second translation means comprising:
  a second clock synchronizer for performing clock synchronization with the GMII reference clock and the SPI3 reference clock upon translating the SPI-3 transmission signal into the GMII transmission signal;
  an SFD pattern information generator for generating preamble and SFD pattern information according to a reference clock signal from the second clock synchronizer; and
  a second controller for translating the generated preamble and SFD pattern information from the SFD pattern information generator, and the SPI-3 transmission signal, into the GMII transmission signal according to the GMII reference clock from the second clock synchronizer.

5. The system according to claim 4, said second controller comprising:
  an SPI-3 transmission controller for synchronizing the SPI-3 transmission signal with the SPI3 reference clock; and
  a GMII transmission controller for translating the SPI-3 transmission signal synchronized by the SPI-3 transmission controller into the GMII transmission signal according to the GMII reference clock.

6. A system for gigabit media independence interface (GMII)-to-system packet interface level 3 (SPI-3) interface translation, comprising:
  a first translation circuit for translating a GMII reception signal received from the GMII interface device into an SPI-3 reception signal synchronized with an SPI3 reference clock based on starting frame delimiter (SFD) pattern information in the GMII reception signal; and
  a second translation circuit for translating an SPI-3 transmission signal received from an SPI-3 interface device into a GMII transmission signal synchronized with a GMII reference clock by adding the SFD pattern information to the SPI-3 transmission signal;
  said first translation circuit comprising:
    an SFD pattern detector for detecting the SFD pattern information from the GMII reception signal received from the GMII interface device;
    a first clock synchronizer for performing clock synchronization with the GMII reference clock and the SPI3 reference clock upon translating the GMII reception signal into the SPI-3 reception signal; and
    a first controller for translating the GMII reception signal into the SPI-3 reception signal according to the SPI3 reference clock from the first clock synchronizer when the SFD pattern information received from the SFD pattern detector matches pre-stored SFD pattern information.

7. The system according to claim 6, said GMII reception signal being received from the GMII interface device in synchronization with the GMII_RXC clock signal only when a GMII RX_DV (Data Valid) signal is high.

8. The system according to claim 6, said first controller comprising:

a comparator for comparing the SFD pattern information received from the SFD pattern detector to the pre-stored SFD pattern information, and for generating a match signal when they match;

a GMII receiving controller for synchronizing the GMII reception signal with the GMII reference clock in response to the match signal generated by the comparator; and an SPI-3 receiving controller for translating the GMII reception signal synchronized by the GMII receiving controller into the SPI-3 reception signal according to the SPI3 reference clock.

9. The system according to claim 6, said second translation circuit comprising:

a second clock synchronizer for performing clock synchronization with the GMII reference clock and the SPI3 reference clock upon translating the SPI-3 transmission signal into the GMII transmission signal;

an SFD pattern information generator for generating preamble and SFD pattern information according to a reference clock signal from the second clock synchronizer; and a second controller for translating the generated preamble and SFD pattern information from the SFD pattern information generator, and the SPI-3 transmission signal, into the GMII transmission signal according to the GMII reference clock from the second clock synchronizer.

10. The system according to claim 9, said second controller comprising:

an SPI-3 transmission controller for synchronizing the SPI-3 transmission signal with the SPI3 reference clock; and a GMII transmission controller for translating the SPI-3 transmission signal synchronized by the SPI-3 transmission controller into the GMII transmission signal according to the GMII reference clock.

11. A method for gigabit media independence interface (GMII)-to-system packet interface level 3 (SPI-3) interface translation, the method comprising the steps of:

receiving a GMII reception signal from a GMII interface device; and translating the GMII reception signal received from the GMII interface device into an SPI-3 reception signal synchronized with an SPI3 reference clock based on starting frame delimiter (SFD) pattern information in the GMII reception signal, wherein the step of translating the GMII reception signal received from the GMII interface device into the SPI-3 reception signal synchronized with the SPI3 reference clock comprises:

detecting the SFD pattern information from the GMII reception signal received from the GMII interface device;

performing clock synchronization with a GMII reference clock and the SPI3 reference clock upon translating the GMII reception signal into the SPI-3 reception signal; and translating the GMII reception signal into the SPI-3 reception signal according to the SPI3 reference clock when the detected SFD pattern information matches pre-stored SFD pattern information.

12. The method according to claim 11, wherein the GMII reception signal is received from the GMII interface device in synchronization with a GMII_RXC clock signal only when a GMII RX_DV (Data Valid) signal is high.

13. The method according to claim 11, wherein the step of translating the GMII reception signal into the SPI-3 reception signal according to the SPI3 reference clock comprises:

comparing the detected SFD pattern information to the pre-stored SFD pattern information, and generating a match signal when they match;

synchronizing the GMII reception signal with the GMII reference clock in response to receiving the match signal; and translating the GMII reception signal into the SPI-3 reception signal according to the SPI3 reference clock.

14. A method for gigabit media independence interface (GMII)-to-system packet interface level 3 (SPI-3) interface translation, the method comprising the steps of:

receiving an SPI 3 transmission signal from an SPI-3 interface device; and translating the SPI-3 transmission signal received from the SPI-3 interface device into a GMII transmission signal synchronized with a GMII reference clock by adding starting frame delimiter (SFD) pattern information to the SPI-3 transmission signal, wherein the step of translating the SPI-3 transmission signal received from the SPI-3 interface device into the GMII transmission signal synchronized with the GMII reference clock by adding the SFD pattern information to the SPI-3 transmission signal comprises:

performing clock synchronization with the GMII reference clock and an SPI3 reference clock;

generating preamble and SFD pattern information according to the GMII reference clock; and translating the preamble and SFD pattern information, and the SPI-3 transmission signal, into the GMII transmission signal according to the GMII reference clock.

15. The method according to claim 14, wherein the step of translating the preamble and SFD pattern information, and the SPI-3 transmission signal, into the GMII transmission signal according to the GMII reference clock comprises:

synchronizing the SPI-3 transmission signal with an SPI3 reference clock; and translating the SPI-3 transmission signal synchronized with the SPI3 reference clock into the GMII transmission signal according to the GMII reference clock.

* * * * *

UNITED STATES PATENT AND TRADEMARK OFFICE
CERTIFICATE OF CORRECTION

PATENT NO.       : 7,639,695 B2                                      Page 1 of 1
APPLICATION NO.  : 11/300357
DATED            : December 29, 2009
INVENTOR(S)      : Han et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Twenty-first Day of December, 2010

David J. Kappos
*Director of the United States Patent and Trademark Office*